Figure 1:
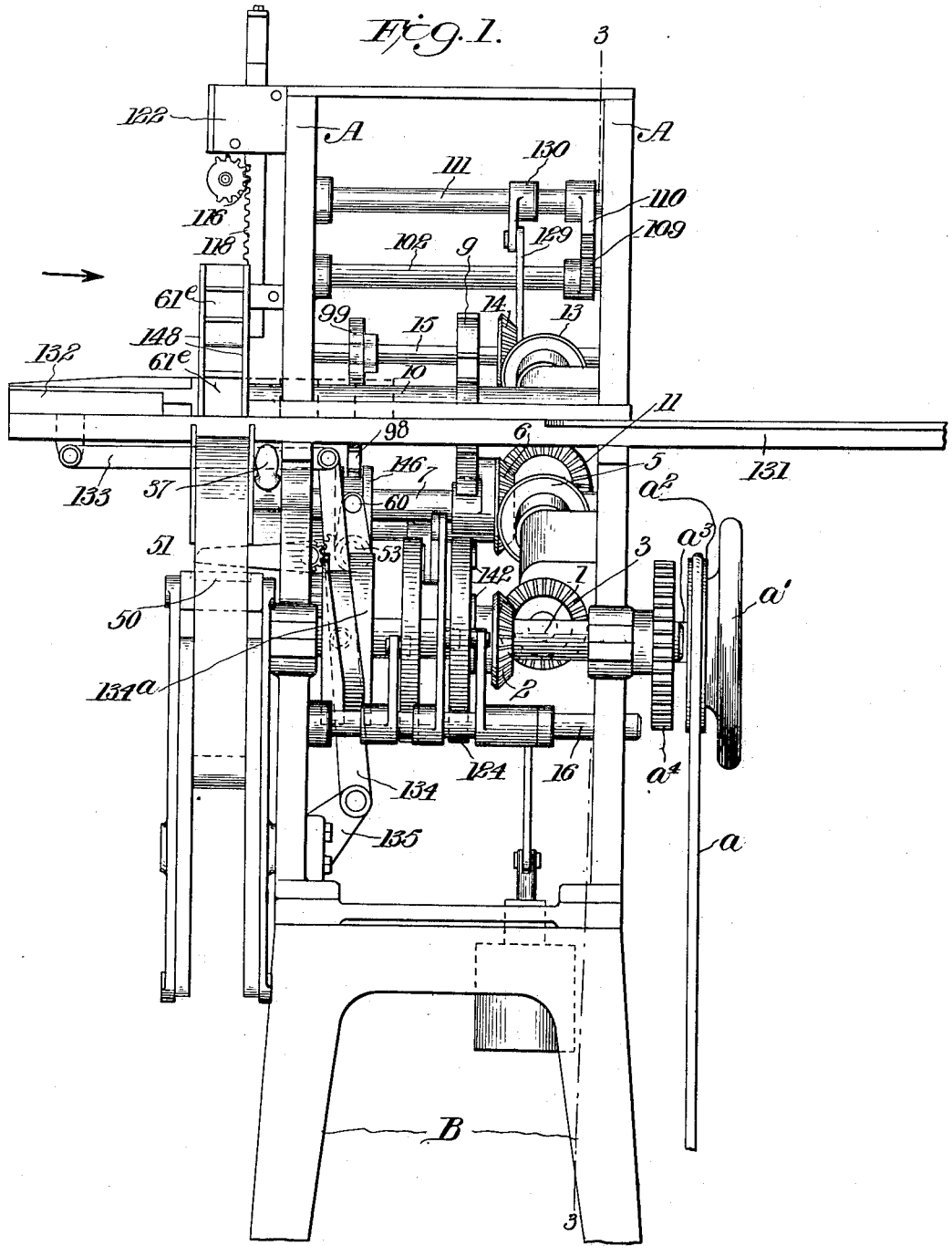

T. G. McGIRR.
MACHINE FOR WRAPPING YEAST CAKES AND SIMILAR ARTICLES.
APPLICATION FILED AUG. 16, 1912.

1,091,684.

Patented Mar. 31, 1914.

8 SHEETS—SHEET 2.

WITNESSES

INVENTOR
Theodore G. McGirr
By Robt. P. Hains
Attorney

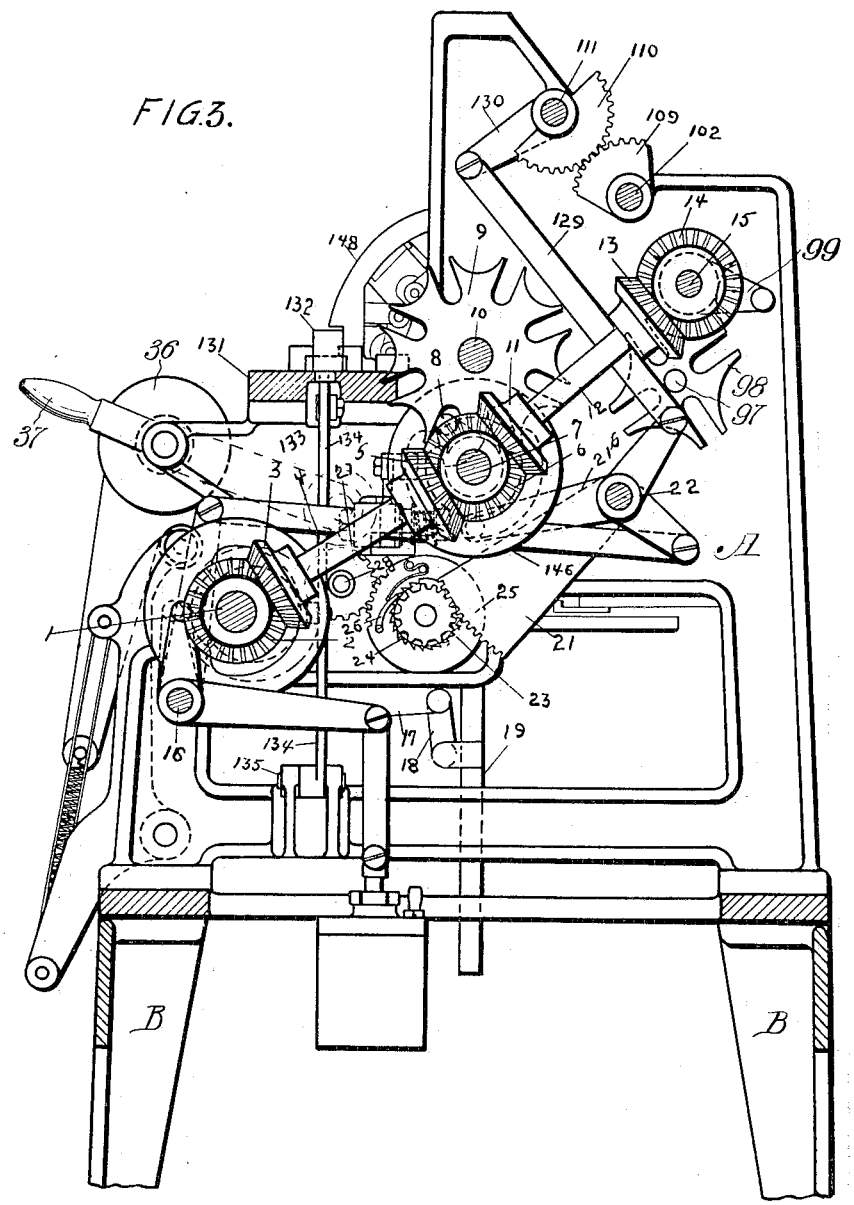

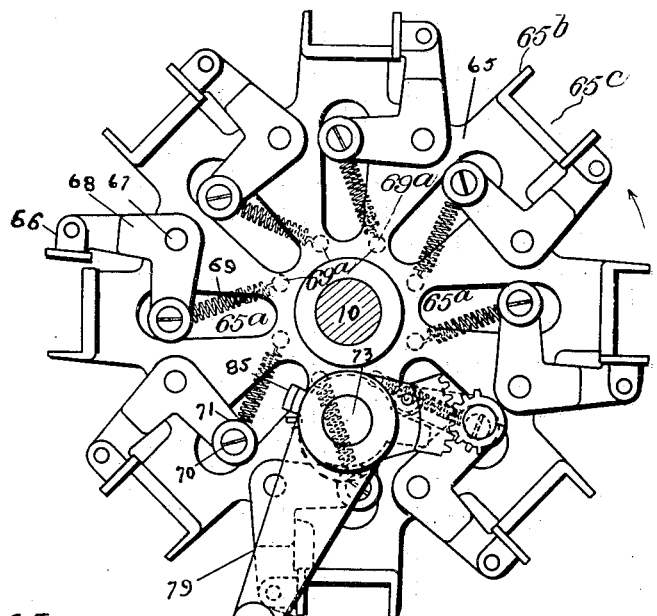
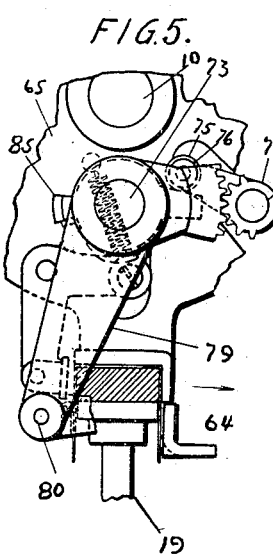
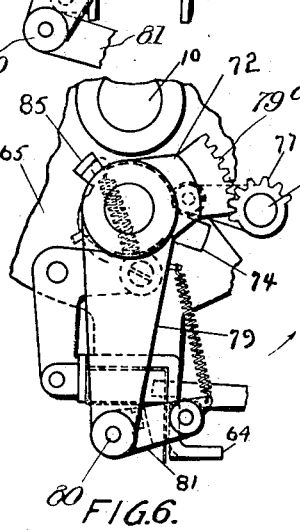
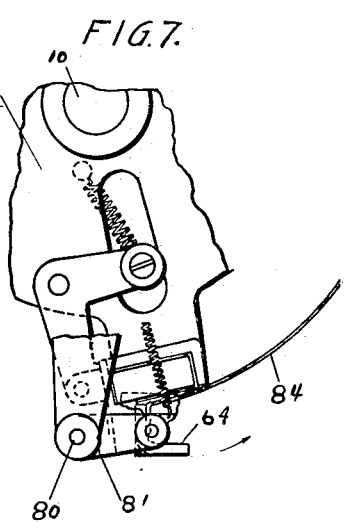

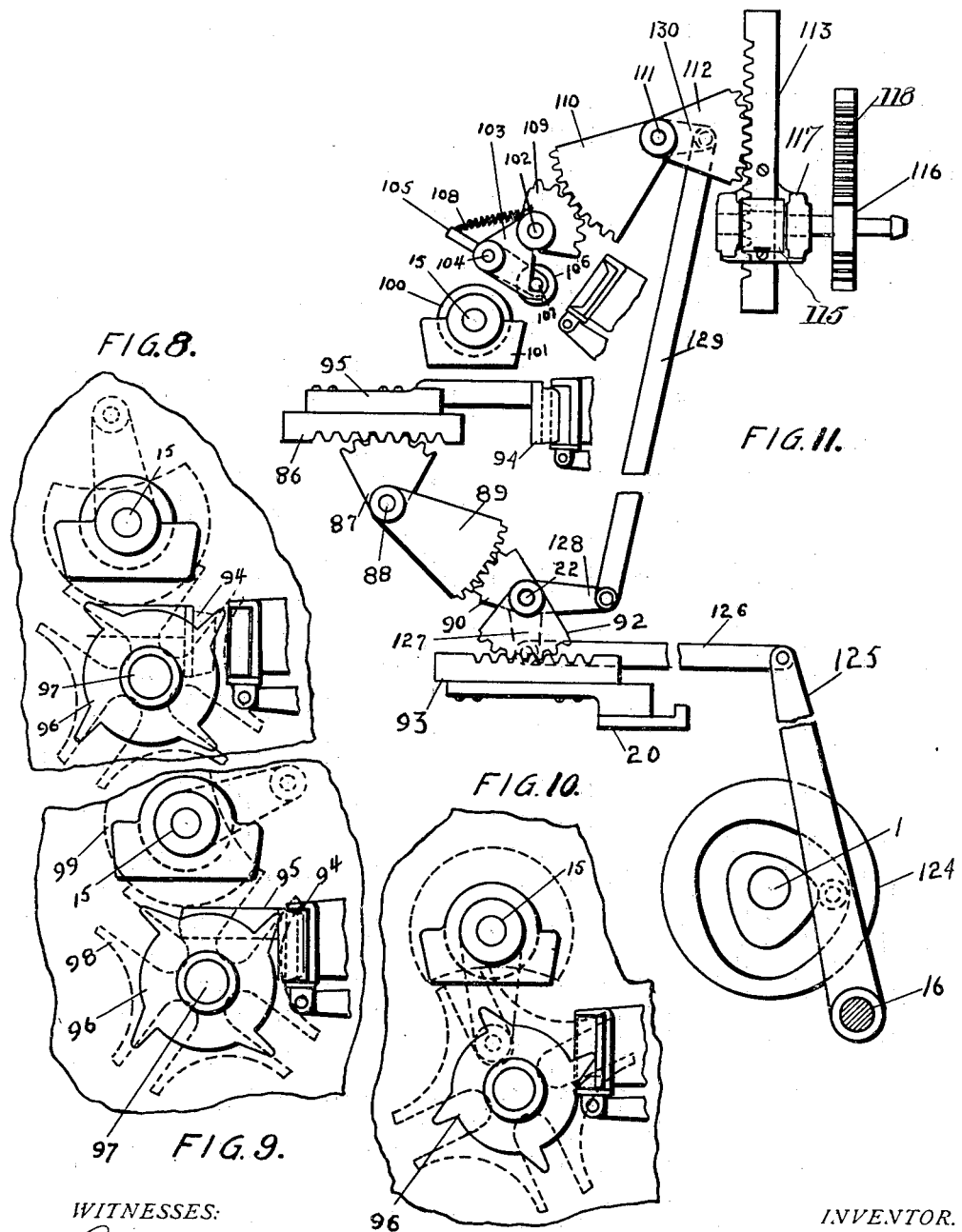

T. G. McGIRR.
MACHINE FOR WRAPPING YEAST CAKES AND SIMILAR ARTICLES.
APPLICATION FILED AUG. 16, 1912.

1,091,684.

Patented Mar. 31, 1914.
8 SHEETS—SHEET 6.

WITNESSES:
C. M. Walker.
E. Williams

INVENTOR.
Theodore G. McGirr
BY
Robt. P. Hains
ATTORNEY.

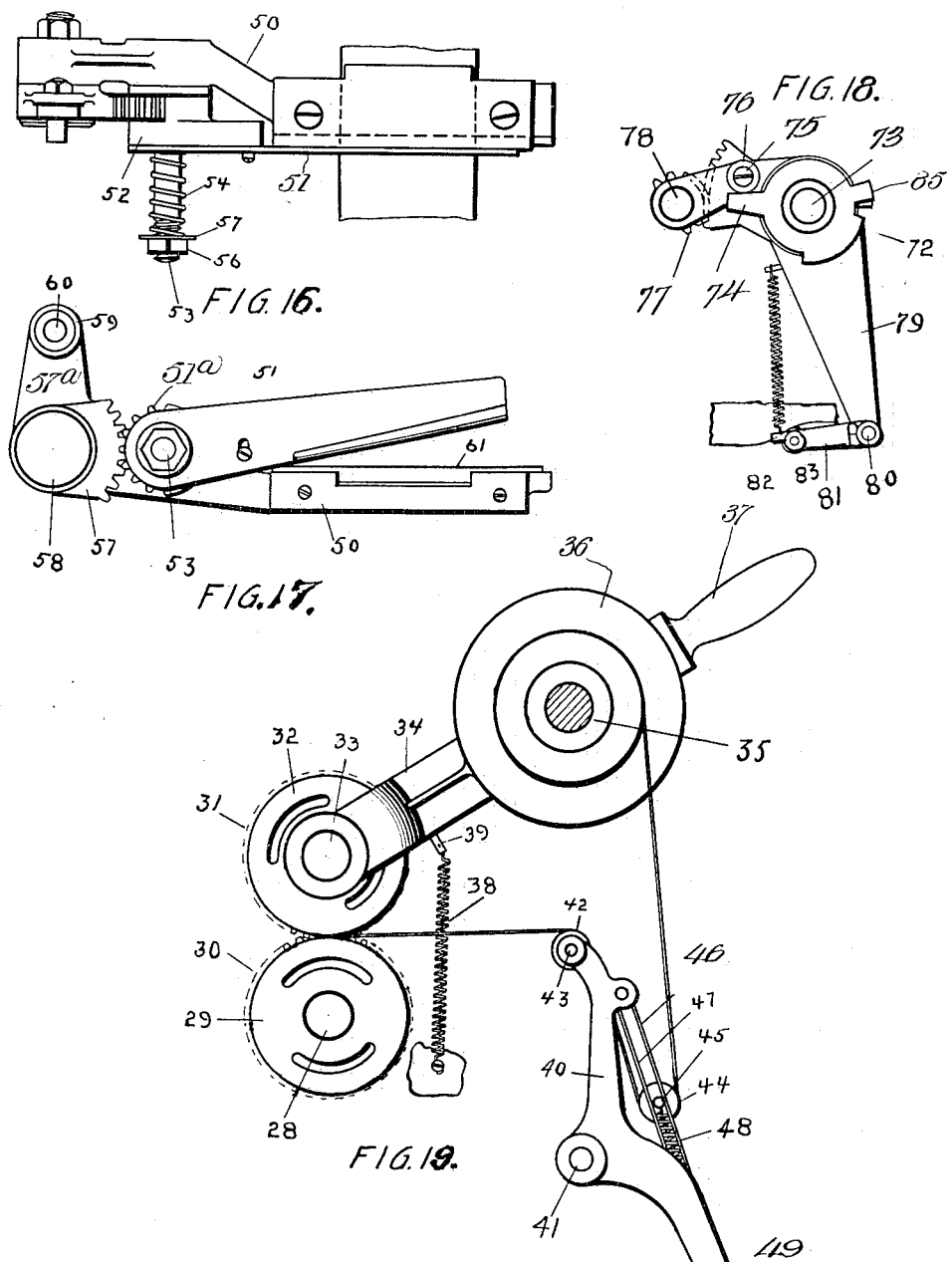

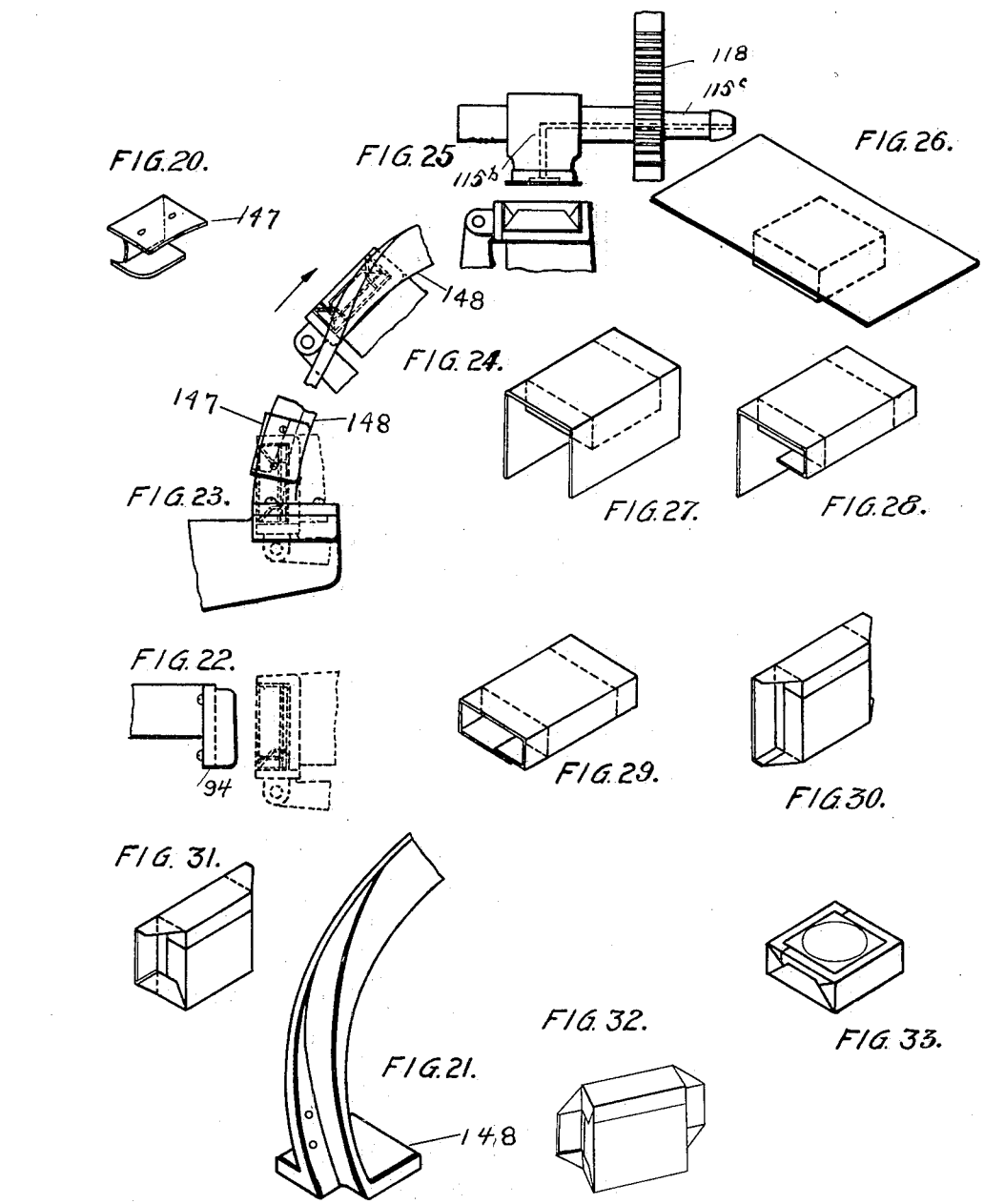

UNITED STATES PATENT OFFICE.

THEODORE G. McGIRR, OF SPRINGFIELD, MASSACHUSETTS, ASSIGNOR TO USONIA MACHINE COMPANY, OF SPRINGFIELD, MASSACHUSETTS, A CORPORATION OF NEW YORK.

MACHINE FOR WRAPPING YEAST-CAKES AND SIMILAR ARTICLES.

1,091,684. Specification of Letters Patent. Patented Mar. 31, 1914.

Application filed August 16, 1912. Serial No. 715,385.

*To all whom it may concern:*

Be it known that I, THEODORE G. McGIRR, a citizen of the United States, residing at Springfield, in the county of Hampden and State of Massachusetts, have invented certain new and useful Improvements in Machines for Wrapping Yeast-Cakes and Similar Articles, of which the following is a full, clear, and exact specification.

This invention relates to wrapping machines and is designed principally for use in wrapping yeast cakes and similar articles which must be handled in such manner as to avoid unnecessary pressure and consequent distortion in the process of wrapping, and, generally speaking the machine hereinafter described and claimed comprises mechanism for performing the various steps of feeding the wrapping material, cutting off the desired length of material, placing the article to be wrapped therein, wrapping the article, presenting the wrapped article in position to have adhesive applied thereto, removing a single label from a magazine and applying the same to the wrapped article, and delivering the properly wrapped and labeled package, in position to be readily inspected, all in one continuous operation.

The machine shown and described is a rotary type of machine and is adapted for use in wrapping yeast cakes with the usual tin foil or wax paper, an intermittently operating folding wheel or carrier being provided, wherein the article is successively presented to the various devices which fold, label and discharge the completed package in one continuous operation.

The primary object of the invention is the production of an apparatus of this character for wrapping and labeling yeast cakes and similar articles in rapid and successive manner.

A further object is the construction of a machine of this character wherein the disadvantages incident to the use of wrapping machines heretofore is avoided, particularly in respect to the unnecessary compressing and consequent distortion of the article being wrapped, the overcoming of such objectionable features being particularly desirable where yeast cakes are being wrapped.

A further object is the provision of a machine whereby in one continuous operation articles to be wrapped are automatically fed to the machine, wrapped, labeled and discharged in position to be readily inspected.

A further object is the provision of a machine of this character wherein the articles being wrapped are automatically fed to a folding wheel or carrier and the wrapper automatically turned in and folded around the article and then adhesive applied to the wrapper on one side thereof and label affixing mechanism for applying the label to that portion of the wrapper.

Another object is the provision of the particular form of mechanism for removing the label from a magazine or hopper by suction and applying said label to the wrapped package.

Another object is the provision of a machine of this character wherein the article to be wrapped is carried through the various operations of wrapping, applying adhesive thereto, labeling and delivered in completed form without intermediate handling of any kind or character.

Another object is the provision of means whereby in one continuous operation the suction plate removes a label from the magazine and carries the same to position over that part of the wrapper which has previously had adhesive applied thereto and continued downward movement of the suction plate the necessary distance to gently place the label on the wrapper whereby it is permanently affixed thereto.

With these and other objects in view the invention will hereinafter be fully described and particularly set forth in the claims at the end of said description.

Figure 2:
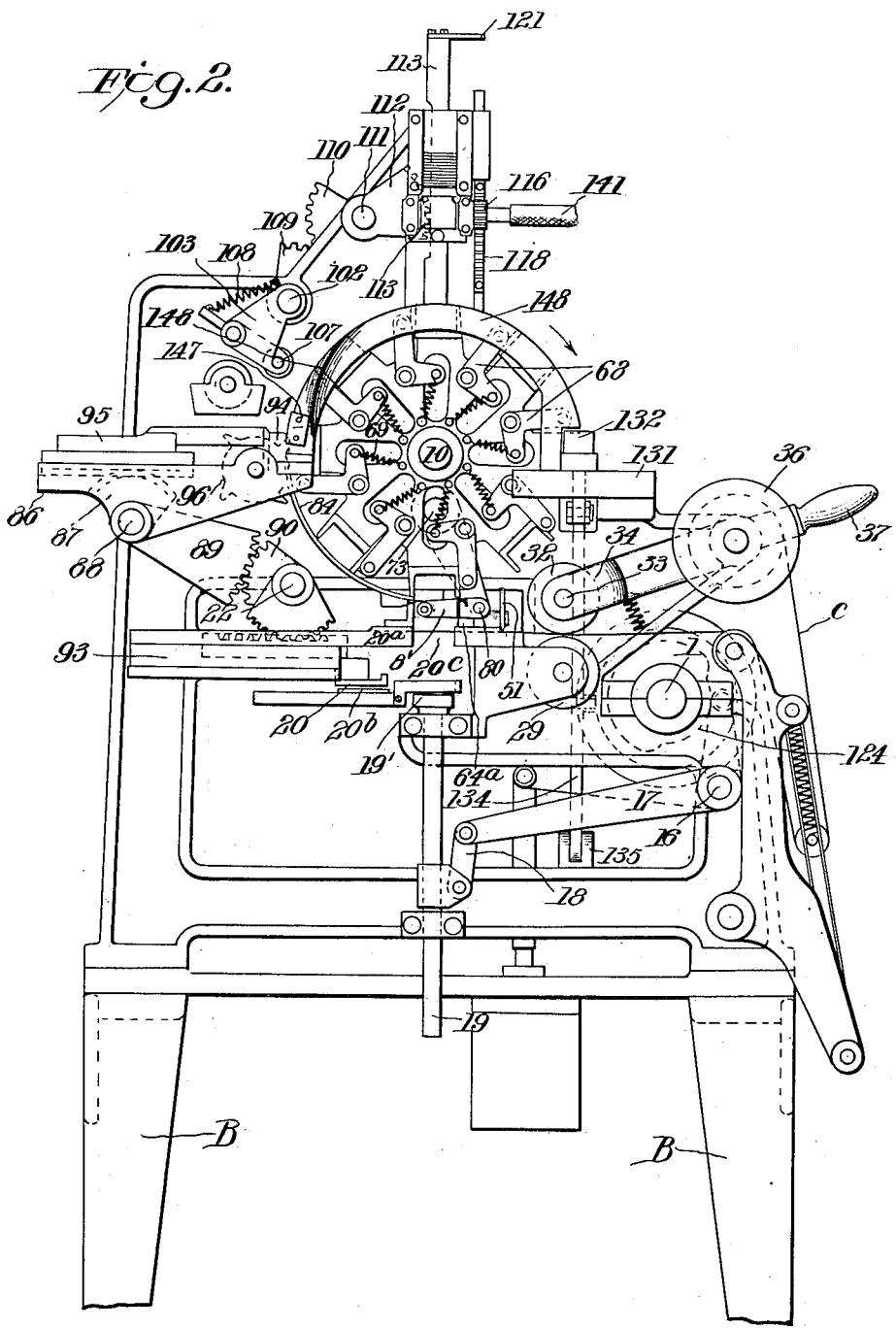
Figure 12:
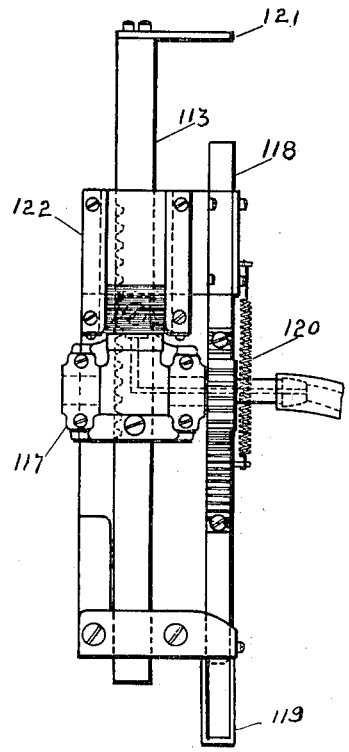
Figures 13, 14:
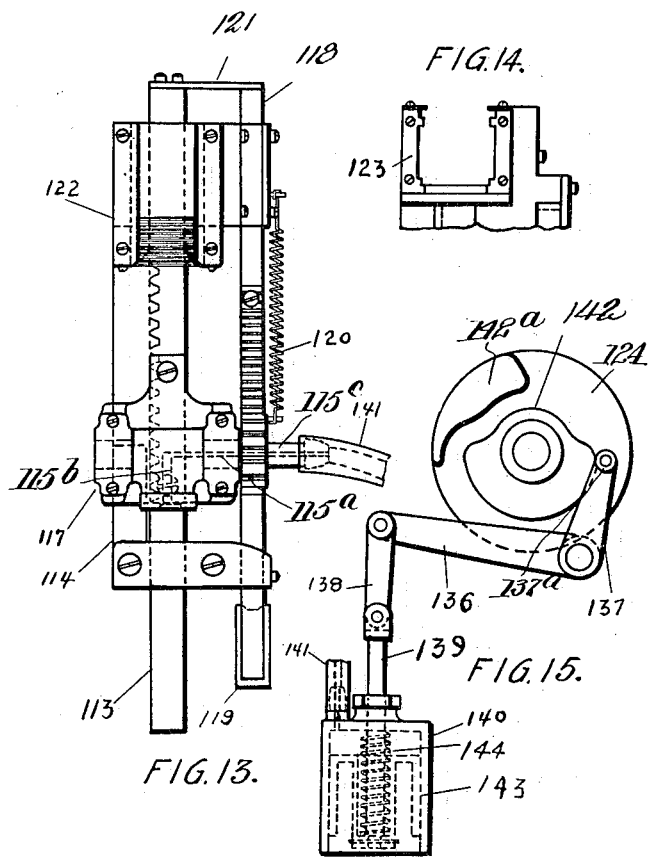
Figure 15:
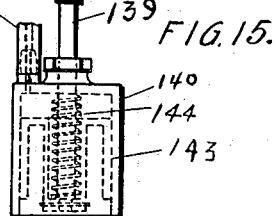

Referring to the accompanying drawings wherein similar numerals of reference indicate corresponding parts in each of the several views:—Figure 1 is a front elevation of the completed machine; Fig. 2 is a side elevation, looking in the direction of the arrow Fig. 1; Fig. 3 is a sectional view on the line 3—3 Fig. 1, looking toward the left of Fig. 1; Fig. 4 is a detail elevation of the folding wheel or carrier and associated parts looking toward the left in Fig. 1; Figs. 5, 6 and 7 are fragmentary views, illustrating the different positions assumed by the jaw opening cam and back folding lever; Figs. 8, 9 and 10 are fragmentary detail views, illustrating the different positions assumed by the tucker and rotary folder; Fig. 11 is a diagrammatic view illustrating the mechanism feeding article to be wrapped, tucking the wrapper, placing the adhesive on the wrapper and applying the label thereto. Fig. 12 is a detail side elevation of the labeling mechanism looking in the direction of the arrow Fig. 1; Fig. 13 is a similar view illustrating the suction device in position to deposit the label on the package; Fig. 14 is a fragmentary detail bottom plan view of the label magazine or hopper; Fig. 15 is a detail perspective view of the pump operating mechanism; Fig. 16 is a detail plan; and Fig. 17 is a detail side elevation of the wrapper cutting mechanism; Fig. 18 is a fragmentary detail view of the jaw operating cam, looking in the direction of the arrow Fig. 1; Fig. 19 is a detail side elevation of the wrapper feeding mechanism; Fig. 20 is a detail view of the tucker; Fig. 21 is a fragmentary detail view of the stationary folder; Figs. 22, 23 and 24 are detail views illustrating different stages in the folding of the wrapper; Fig. 25 is a detail view of the package in position to be labeled. Figs. 26 to 33 inclusive, are perspective views of the package, illustrating the different positions of the wrapper in the various steps of wrapping.

In the drawings the frame of the machine has the two upright side pieces A mounted on legs B. Mounted in bearings in said side members A is the main shaft 1, power being applied thereto by means of the belt $a$ or in any other preferred manner. The belt $a$ passes over the wheel $a^2$ on a stud shaft $a^3$ projecting from the side of the frame and a small pinion on said stud shaft meshes with the gear $a^4$ on the main shaft. The hand wheel $a'$ is also provided for operating the mechanism by hand if necessary for any purpose.

On the main shaft are mounted the principal cams, through which motion is imparted to the various parts of the machine. A bevel gear 2 is also mounted upon this shaft 1, said gear meshing with the bevel gear 3, secured to the lower end of an angle shaft 4 mounted in bearings in a lug or projection $a^2$ on one side of the frame. The upper end of said angle shaft 4 carries a bevel gear 5 said bevel gear 5 meshing with the bevel gear 6, the bevel gear 6 being rigidly secured to a shaft 7 which, for convenience, will be designated as an auxiliary cam shaft. On this shaft 7 is mounted the cam for operating mechanism for feeding the tin foil, wax paper or other material used as a wrapper and also the cam for operating the mechanism for cutting the tin foil or other wrapping material into proper lengths, as well as one member of the mechanism for intermittently rotating the folding wheel or carrier all as will be hereinafter more particularly described.

Another angle shaft 12 is mounted in the frame and carries at its lower end a bevel gear 11 in mesh with the bevel gear 6 on the shaft 7. To the upper end of said angle shaft 12 is fixed a bevel gear 13 in mesh with a bevel gear 14 on a shaft 15, for a purpose as will hereinafter appear.

Below the main shaft 1 and in the front portion of the machine and in proper relation to said main shaft there is mounted a fulcrum shaft 16. One end of a lever 17 is secured to said shaft 16 and at its opposite end carries a link 18 which connects said lever 17 with the plunger or ram 19. The plunger 19 comprises a body of any preferred construction slidably mounted in vertically disposed bearings, and is provided with a head 19′ corresponding to the size of the article to be wrapped. After the article to be wrapped has been fed to the table and is located over the opening therein just above the head of the plunger 19, all as will be hereinafter described, the plunger ascends and the head thereof contacting with the article to be wrapped carries the same into the first step of wrapping.

The roll of tin foil or other wrapping material C is carried on the stud 35 rotatably mounted in the outer end of the yoke or lever 34, the forked inner end of said yoke carrying a roll or shaft 33 on which is mounted one of the feed rolls 32, to one side of which feed roll 32 is secured a gear wheel 31 whose teeth mesh with teeth 30 on the lower feed roll 29, the latter feed roll being mounted on the shaft 28 and rotation imparted to said last mentioned feed roll as will hereinafter appear.

The free end of the tin foil or wrapping material is carried downwardly to a tension device comprising the member 40 stationarily secured to the frame as at 41. In the upper part of said member is rotatably mounted the roll 42 on the stud 43. Another roll 44 is provided with studs 45 adapted to engage a guideway formed by the guide pieces 46 and 47. This roll 44 is held under tension in said guideway by means of the springs 48, the opposite ends of said springs being attached to the rolls or studs 49. The free end of the tin foil is passed under the roll 44 back over the roll 42 and in between the feed rolls 32 and 29. The feed roll 32 carried by the yoke 34 is held in frictional contact with the feed roll 29 by means of the spring 38 having one end secured to the yoke as at 39 and the other end secured to the frame. A handle 37 is provided for convenience in adjusting the upper feed roll for purpose of placing the free end of the foil in the first instance between the feed rolls.

Above the line of travel of the horizontal plunger or ram 20 and parallel therewith is a table 20ª upon which the tin foil or other wrapping material is fed. After passing between the feed rolls 29 and 32 the tin foil is fed to said table a predetermined distance, extending over an opening 20ᶜ in said table 20ª. Located between the feed rolls and the table 20ª and in position to cut off the required amount of wrapper is the cutting mechanism. Said cutting mechanism comprises a scissors like arrangement of knives or cutting edges, the stationary member 50 thereof being rigidly secured to the table 20ª and the movable member 51 being pivotally mounted on the stud 53. The inner end of said movable member 50 is provided with a segmental gear 51ª which is in mesh with the segmental gear 57 mounted on the stud 58. The segmental gear 57 has an upstanding arm 57ª which carries a stud 60 and roll or projection 59, said roll 59 engaging and traveling in the cam groove on the periphery of a cam 146 on the shaft 7, thereby imparting the necessary movement to the member 51 for severing the tin foil at the proper time. The stationary member 50 of the knife is provided with a guard 61 which provides a sort of channel in the knife in which the tin foil travels and prevents the tin foil from being lifted by the moving member 51. The face of said cam 146 is provided with a cam groove engaged by the mechanism for operating the tin foil feeding device. A shaft 22 is journaled in bearings in the frame of the machine and on said shaft is mounted the lever 21 carrying at one end a stud 21ª which travels in the cam groove in one face of the cam 146. The lever 21 has another member or arm 21ᵇ which extends downwardly and is provided at its lower end with teeth which mesh with teeth on the pinion 23, said pinion having secured thereto a ratchet 24. This ratchet operates the gear 25 by means of pawl 26, the gear 25 meshing with the gear 27 on the shaft 28 and causing rotation thereof. When the lever 21ᵇ with its teeth moves downwardly the gears are rotated but by reason of the ratchet mechanism, the gears remain at rest when said lever 21ᵇ is moved back to its place of rest or normal position. On the opposite end of the shaft 28 is mounted the feed cylinder 29 as hereinbefore described. The gear 30 of feed roll 29 meshing with gear 31 of feed roll 32 imparts rotation thereto and the tin foil being held between the two rolls is frictionally drawn forward and fed to proper position on the table 20ª over the opening 20ᶜ therein. When a predetermined amount of tin foil is fed to the table and beyond the knives 50, 51, the knife member 51 comes into play and severs the tin foil leaving it in position for the next step in the operation of the machine.

The shaft 10 extends through one side of the frame A and mounted thereon is the folding wheel. The folding wheel comprises a plate like member 65 formed with slots or openings 65ª extending around the same and having the L-shaped projections or flanges 65ᵇ, forming the bottom and the stationary side wall of the channels or pockets 65ᶜ. L-shaped levers 68 have one end provided with a flange or projection 66, which flange 66 forms the movable side wall of said pockets. The inner portion of the L-shaped levers 68 are forked and straddle the plate 65 and are pivotally mounted thereon by means of the stud or pivot 67. The other member of the forked arm or lever has one end of a spring 69 connected thereto, the opposite end of said spring being connected to a stud or pin 69ª on the plate 65. The opposite arm of the forked lever, that is the inside member, carries a stud 70 having mounted thereon a roll 71, said roll adapted to engage the jaw opening cam 72, loosely mounted on the rocker shaft 73. A cam 72 is provided with a lug or extension 74 on one side thereof upon which lug the stud 75 and roll 76 mounted on the lever arm of the segmental gear 77 operate. On the opposite side of said cam is a lug or projection 85 which acts as a stop for the cam. The toothed end of the lever 77 meshes with the teeth on the back folding lever 79 rigidly secured to the rocker shaft 73. On the opposite end of the shaft 73 is the cam lever provided with a stud and roll which engages the cam groove in the cam located upon the auxiliary cam shaft 7.

The folding lever 79 has at its lower end a stud 80 on which is mounted a back folder arm lever 81, carrying a flange or blade by which the back fold is made in wrapping the articles. A stud 82 having a roll 83 thereon contacts with a stationary cam secured to the frame of the machine and permits movement of the folding blade over the bottom of the article and clear of the edge as the article is being rotated or carried around by the folding wheel 65. It will thus be seen that when movement is imparted to the cam lever secured to the rocker shaft 73 it will move the folding blade back and away from the article, during which time the geared lever 77, by reason of engagement therewith, will cause the cam 72 to turn, allowing the roll 77 on the jaw 68 to drop from its highest point and the movable jaw 66 to engage the partially folded article and retain the same within the pocket or channel in the folding wheel 65.

The tin foil or wrapper being in position on the table 20ª over the opening 20ᶜ and the plunger or ram 19 having been operated, carries the article on the head of the plunger through said opening 20ᶜ and into the tin foil or wrapper C through the side folders 64 and 64ª, and into the U-shaped pockets or channels 65ᶜ, this action folding the two side flaps of the wrapper downwardly, as indicated in Fig. 27.

The rear flap having been folded in upon the under side of the package, as hereinbefore described, the folding wheel commences to rotate and the front flap is brought in contact with the side folder 64 which folds the front flap down upon the article and upon the rear flap which has previously been folded, leaving the wrapped article in the condition shown in Fig. 29. A guard 84 retains the partially folded package in position as it is carried around by the folding wheel or carrier 65.

Mounted on the folding wheel shaft 10 is a star wheel 9, which is operated intermittently by means of the escapement 8 mounted on the auxiliary cam shaft 7. The proper amount of rotation of the folding wheel or carrier is given so that the successive pockets or channels 65ᶜ are always properly alined with the various coacting devices and said wheel is locked in that position during the various operations upon the package.

To the rear of the machine is secured the stud 88 on which is mounted a segmental gear 87. This gear 87 engages with the toothed rack 86. Said toothed rack has mounted thereon a tucker arm 95, and provided on each side of said tucker arm is a tucker 94. Rigidly secured on the stud 88 is another segmental gear or arm 89, operating in unison with the segmental gear 87. The teeth of gear 89 mesh with another segmental gear 90, mounted on the rocker shaft 22. A segmental gear 92 is also mounted on said rocker shaft 22 and projects downwardly and meshes with rack 93 carrying the pusher 20, which pusher removes the article to be wrapped from the feed belt 20ᵇ onto the head of the plunger or ram 19. It will thus be seen that as an article is moved from the feed belt or fed to the plunger head another article having had several steps performed in the operation of wrapping, is being tucked by the tuckers 94 secured upon each side of the tucker arm 95. The rack 86 is in line with the center of the folding wheel 65.

Below the tucker arm 95 and adjacent the periphery of the folding wheel 65 are located the rotating tuckers 96, which operate upon both sides of the package and contact with the lower outstanding ears of the package and fold them up and against the sides of the package and then pass out of the path of travel of the package. These rotating folders are secured to the shaft 97 and have four lugs or projections which alternately act upon the packages.

On the inside of the frame and on the opposite end of the shaft 97 is mounted the star wheel or female member 98 of the escapement mechanism which gives to the rotary tuckers their intermittent rotation. This member 98 is operated in turn by a male member 99 secured to the shaft 15, said shaft 15 being rotated by means of the gears 13 and 14 as hereinbefore described. As soon as the rotary tuckers 96 have performed their functions and come to rest, the continued rotation of the carrier or folding wheel 65 brings the outstanding ears of the partially folded wrapper into contact with the stationary folders 147, secured to the circular folding scrolls 148 secured on each side of the folding wheel or carrier 65. These folders 147 fold in the upper outstanding ears of the wrapper and continued rotation of the carrier brings the last outstanding flaps into contact with the scrolls 148, and completes the wrapping of the article.

Secured to the outer end of the constantly driven shaft 15 is a glue roll 100 which rotates in glue or paste contained in the glue pot 101. Located above the glue pot in radial relation to the folding wheel 65 is mounted in the frame a rocker shaft 102. This rocker shaft 102 carries a distributer frame 103 which has a shaft 104 on which is mounted a distributer yoke 105 having a glue distributing roll 106 mounted on a shaft 107 therein. Lugs on the frame engage the ends of the shaft 107 of the distributing roll 106 and form a stop therefor, while a spring 108 keeps the roll 106 in proper relation to both receive glue from the roll 100 and distribute it upon the upturned face of the package held in the U-shaped channel or pocket of the folding wheel.

On the shaft 102 and between the side frames of the machine is mounted a segmental gear 109 in mesh with another segmental gear 110 mounted on the shaft 111. Upon the outer end of the shaft 111 is mounted a segmental gear 112 in mesh with the rack 113 housed in a bracket 114. Mounted in bearings 117 in this rack is a suction plate 115, said plate consisting of a plate or table rotatable on its axis in the bearing 117 and provided with a pinion 116 which meshes with the toothed rack 118, said rack 118 being free to reciprocate within the bracket 114. The rack 118 has a stop 119 at its lower end and is held up by a spring 120. The upper end of the rack 113 has an arm 121 which extends over the rack 118. Just over the top of the suction plate or table there is secured to the frame a magazine or hopper 122 for containing the labels to be applied to the article after it has been wrapped. The bottom of the hopper is open and is provided with stops 123 on each side thereof which retain the labels in position to be readily drawn through the opening in the bottom past said stops. The axis of the suction plate is hollow or tubular as at 115ª and communicates with the opening 115ᵇ in the face of the suction plate. A nipple 115ᶜ adjoins the axis of the suction plate and to this nipple is connected a tube or pipe 141 leading to the pump 140 secured to the lower portion of the machine. The pump is operated at the proper time to create a suction in the plate and remove a label from the magazine by means of the lever 136 pivoted to link 138 connected to the piston rod 139 of the pump. A short lever 137 is connected to the lever 136 and carries a lug or roller 137ª which travels on the cam groove formed on the face of the cam 124 by the cam plates 142, 142ª fixedly secured on the back of said cam 124, the cam 124 being on the shaft 1 as hereinbefore set forth.

The pump piston is held at its lowermost position by means of springs 144 and its downward movement exhausts the air from the suction plate 115 and consequently withdraws a label from the magazine and said label adheres to the face of the suction plate. The piston is drawn into position for the next stroke at the proper time by the action of the cam 142 and the connections with the pump.

The operation of the suction plate in depositing the label will be readily understood. The action of the cam 142 causes the piston 143 to respond to the pressure of the coiled spring 144 within the pump and to descend rapidly, thereby tending to exhaust all of the air from the pump and through its connection by means of the hose with the nipple 115ᶜ on the suction plate, the air is exhausted therethrough and air is drawn through the perforated suction plate when the piston drops in the pump 140. The inrush of air tends to draw against the face of the suction plate the lowermost label in the hopper 122 and at this point the rack 113 commences to descend and the label is carried by the suction plate downwardly, the suction plate being rotated outwardly by means of the segmental gear being in engagement with the rack 118. This action continues until the label has been completely removed from the hopper and the suction plate turned through one-half of a revolution, the face of the suction plate now being downwardly as indicated in Fig. 13. At this point the arm 121 secured to the top of the rack 113 comes in contact with the rack 118 and the tension of the spring 120 is overcome, thereby moving the rack 118 downward at the same rate of speed as the rack 113 is traveling. This action stops the rotation of the suction plate and the last part of the movement of the suction plate is in a vertical or downward direction which prevents a wiping operation when the label is actually applied to the package. When the suction plate is in position for depositing the label on the package the piston 143 on the pump 140 begins to move upwardly against the tension of the coiled spring 144. This causes whatever air may have been drawn in through the opening in the suction plate to be blown out through the same channel and tends to hold the label to the package and force it away from the suction plate when the suction plate commences its return movement. After ascending a short distance the rack 118 is arrested in its upward movement by the stop 119 on its lower extremity which comes in contact with the housing. The rack 113 continues to move upwardly, however, and the segmental gear in engagement with the rack 118 causes the suction plate to ascribe an arc of 180 degrees and come to rest below the stack of labels in the hopper 122 in position to take the next label and apply it to a package. It is understood, of course, that this operation takes place while the carrier wheel is at rest and it is not necessary for the suction plate to come into actual contact with the labels as the inrush of air sucks the lowermost label from its position to the face of the suction plate.

The article having been wrapped and properly labeled the same is still in the carrier or folding wheel and has reached a position in front of the discharge table 131 and ready to be delivered to said table for inspection and distribution. In this position the reciprocating plunger or delivery member 132 comes into play and pushes the wrapped article from the carrier onto the table 131, this operation continuing as each article is brought into position to be pushed by the plunger 132. The delivery plunger 132 is actuated by means of a link 133 which is connected to the cam lever 134, said cam lever being fulcrumed on the stud 135 at the lower part of the frame. This cam lever 134 is operated by means of a drum cam 134ª on the main shaft 1, the rotation of the cam 134ª and consequent action upon the cam lever 134 causes a reciprocation of the plunger 132 and consequent pushing out from the carrier or folding wheel of the wrapped article onto the discharge or delivery table 131.

The operation of the machine will be readily understood from the foregoing description taken in connection with the accompanying drawings. A roll of tin foil, wax paper, or other desired wrapping material having been placed on the stud or roll 35 the free end of the wrapping material is threaded down around the tension device and up over the roll 42 and between the feed rolls 29 and 32 and the machine started. The various mechanisms it will be understood are timed to perform their functions in relation to the different steps in the operation of wrapping the package. A predetermined amount of wrapping material having been fed to the table over the opening therein the knife comes into play and cuts off this amount of wrapping material, a yeast cake or other article being wrapped having in the meantime been forced or pushed from the transverse feed belt $20^b$ by the pusher 20 onto the head of the plunger 19, and carried by the plunger up through the opening in the table across which the wrapping material extends and continued upward movement of the plunger 19 deposits the article in the condition shown in Fig. 27 in one of the pockets or channels of the folding wheel. Rotation of the main shaft 1 through the connections described rotates the shaft 10 and while the plunger 20 is forcing or pushing the article upon the plunger 19 the lever 21 is acted upon by the cam on the auxiliary cam shaft 7 and is moved upward and as it meshes with the gear 23 carrying the ratchet 24 it causes said gear and ratchet to rotate. As the ratchet 24 rotates in this direction it engages a pawl 26 mounted upon the gear 25, carried by the stud 28, the pawl 26 passing over the ratchet 24 when the gear returns to its position of rest. As the gear 25 rotates it operates the pinion 27, mounted on one end of the shaft 28 carrying the feed cylinder 29 and this provides for the feeding of a predetermined amount of paper between the cylinders 29 and 32. After the paper has been cut, the article being wrapped and the plunger 19 operating to place the article with its wrapper in the pocket of the folding wheel, the upward movement of the plunger being continued, the wrapper is drawn from the foil table and between the side folders 63 and 64. Immediately on the article partly folded being deposited in a pocket of the folding wheel 65 the cam on the auxiliary cam shaft operates the back folder shaft 73 so that the folder 79 will move back and away from the article to be wrapped, this movement of the folder being caused by the segmental gear portion of the folder meshing with gear 77 on stud 78 (see Fig. 5), this gear having an arm with the roll 75 and stud 76 thereon moving downwardly and intercepting the lug portion of the jaw opening cam 72. This operation moves the jaw opening cam, as shown in Fig. 6, so that the movable jaw 66 of the pockets in the folding wheel closes and holds the article and partly folded wrapper firmly within the pocket. The jaw 66 having closed the plunger 19 moves downwardly and the cam causes the back folder 79 to move forward as shown in Fig. 6, which movement folds the back downwardly extending portion of the wrapper upon the article, the article being wrapped then being in the condition shown in Fig. 29. This operation being completed the folding wheel 65 makes a partial rotation through the member 8 engaging the slots in the star wheel 9. As the folding wheel starts to rotate the front downwardly extending portion of the wrapper comes in contact with the side folder 64 and is thus folded down upon the article, the same then being in the condition shown in Fig. 30. The folding wheel is then locked against rotation by means of the members 8 and 9 until other steps in the wrapping have taken place.

The next step in the operation occurs when the pocket containing the partly wrapped article is at a point at right angles to its point of entrance into the folding wheel when by reason of the connection with the fulcrum shaft 22 through the gears 87, 89 and 90, the rack 86 moves forward and said rack carrying the tucking member 95 with the two tucking blades thereon, one on each side thereof. It will be seen that as the rack is moved inward said blades 94 will tuck in the front overlapped sides of the package and cause the same to assume the shape shown in Fig. 31. While the stationary tucking blades 94 are still within the folds of the package the intermittently rotating folder 96 mounted on shaft 97 on each side of the package comes into operation and fold in the lower extended portion of the wrapper as shown in Fig. 32 the rotating folder 96 when it has come to rest is clear of the path of travel of the package, both as it approaches the tucker and as it recedes therefrom. As the wheel continues to rotate with the package having its overlapped sides tucked down upon it and the lower extended portion folded up and upon the side of the article the upper extending portion of the wrapper comes in contact with the top tuckers 147 which are rigidly secured to the folders 148 arranged upon each side of the folding wheel, thereby folding down the upper extended portions of the wrapper upon the article, as seen more clearly in Fig. 33.

The article having been completely wrapped, the folding wheel having come to rest, paste or other adhesive is applied to the overlapped sides to which the label is to be applied, the paste contained in the receptacle 101, as will be clearly seen is applied by means of the coacting rollers and intermediate parts. The folding wheel with the package wrapped, and with paste applied to one side thereof, then resumes its travel to the position where the label is to be affixed. The label feeding mechanism is located above the carrier or folding wheel and directly opposite the point where the package is first placed in the carrier. The suction plate 115, with its opening $115^b$ is at this time now immediately below the label magazine and the pump operates and creates a suction through the plate. The lowermost label is thereby caused to adhere to the face of the suction plate and is carried thereby to position to be deposited and is deposited on the adhesive on the wrapper. The carrier then continues rotation and when opposite the delivery or discharge plunger 132 the plunger comes into play and forces the wrapped article from the carrier onto the table 131, several of the wrapped articles thus discharged, in succession, being indicated in dotted lines in Fig. 1.

Having thus fully described my invention, what I claim as new and desire to secure by Letters Patent of the United States, is:—

1. In a wrapping machine the combination with a rotatable carrier arranged to receive the articles to be wrapped, wrapper feeding mechanism, a rock shaft, means connected with said rock shaft for operating said feeding mechanism, a feed belt for the articles to be wrapped, a plunger below said carrier for successively bringing said articles into engagement with the wrapper and carrier, means operated by said rock shaft for transferring said articles from said belt to said plunger, means coöperating with said carrier for folding the wrappers around said articles, and means for operating said rock shaft and carrier in time with each other.

2. In a wrapping machine the combination with a rotatable carrier arranged to receive the articles to be wrapped, wrapper feeding mechanism, a rock shaft, means connected with said rock shaft for operating said feeding mechanism, a feed belt for the articles to be wrapped, a plunger below said carrier for successively bringing said articles into engagement with the wrapper and carrier, a transversely movable pusher for transferring said articles from said belt to said plunger, means connected with said rock shaft for actuating said pusher, means for operating said rock shaft in time with said carrier and plunger, and means coöperating with said carrier for folding the wrappers around said articles.

3. In a wrapping machine the combination with a rotatable carrier arranged to receive the articles to be wrapped, wrapper feeding mechanism, a rock shaft, means connected with said rock shaft for operating said feeding mechanism, a feed belt for the articles to be wrapped, a plunger below said carrier for successively bringing said articles into engagement with the wrapper and carrier, a transversely movable pusher for transferring said articles from said belt to said plunger, said pusher being provided with a toothed rack portion, a toothed segment connected with said rock shaft and meshing with said rack portion, means for operating said rock shaft in time with said carrier and plunger, and means coöperating with said carrier for folding the wrappers around said articles.

4. In a wrapping machine the combination with a rotatable carrier arranged to receive the articles to be wrapped, wrapper feeding mechanism, a rock shaft, means connected with said rock shaft for operating said feeding mechanism, a feed belt for the articles to be wrapped, a plunger below said carrier for successively bringing said articles into engagement with the wrapper and carrier, a transversely movable pusher for transferring said articles from said belt to said plunger, means connected with said rock shaft for actuating said pusher, means for operating said rock shaft in time with said carrier and plunger, means coöperating with said carrier for folding the wrappers around said articles, said folding means including tuckers, and means connected with said rock shaft for actuating said tuckers.

5. In a wrapping machine the combination with a rotatable carrier arranged to receive the articles to be wrapped, wrapper feeding mechanism, a rock shaft, means for intermittently actuating said wrapper feeding mechanism, an arm secured to said rock shaft for operating said actuating means, a plunger below said carrier for successively bringing the articles to be wrapped into engagement with the wrapper and carrier, means operated by said rock shaft for placing said articles successively upon said plunger, and means coöperating with said carrier for folding wrappers around said articles.

6. In a wrapping machine the combination with a rotatable carrier arranged to receive the articles to be wrapped, wrapper feeding mechanism, a rock shaft, means for intermittently actuating said wrapper feeding mechanism, an arm secured to said rock shaft for operating said actuating means, a pawl and ratchet mechanism for intermittently operating said feed mechanism, a pinion connected with said pawl and ratchet mechanism, a toothed segment connected to said rock shaft and meshing with said pinion, a plunger below said carrier for successively bringing the articles to be wrapped into engagement with the wrapper and carrier, means operated by said rock shaft for placing said articles successively upon said plunger, and means coöperating with said carrier for folding wrappers around said articles.

7. In a wrapping machine the combination with a rotatable carrier arranged to receive the articles to be wrapped, wrapper feeding mechanism, a rock shaft, means for intermittently actuating said wrapper feeding mechanism, an arm secured to said rock shaft for operating said actuating means, a plunger below said carrier for successively bringing the articles to be wrapped into engagement with the wrapper and carrier, means operated by said rock shaft for placing said articles successively upon said plunger, means cooperating with said carrier for folding wrappers around said articles, said folding means including tuckers, and means connected with said rock shaft for actuating said tuckers.

8. A wrapping machine comprising feed rolls, means for supplying wrapping material to said feed rolls, means for successively presenting the articles to be wrapped, and means for folding the wrapping material around said articles, a pivoted arm supporting one of said feed rolls, a rock shaft, an oscillating member secured to said rock shaft and operatively connected with the other feed roll, and means for causing said feed rolls to rotate in unison.

9. A wrapping machine comprising feed rolls, means for supplying wrapping material to said feed rolls, means for successively presenting the articles to be wrapped and means for folding the wrapping material around said articles, a pivoted arm supporting one of said feed rolls, a rock shaft, an oscillating member secured to said rock shaft and operatively connected with the other feed roll, means for causing the said feed rolls to rotate in unison, means for maintaining a frictional engagement between said feed rolls, and a supply roller also carried by said arm.

10. A wrapping machine comprising feed rolls, means for supplying wrapping material to said feed rolls, means for successively presenting the articles to be wrapped, and means for folding the wrapping material around said articles, a pivoted arm supporting one of said feed rolls, a pawl and ratchet mechanism for operating the other feed roll, a rock shaft, an oscillatory member secured to said rock shaft for periodically actuating said pawl and ratchet mechanism, and means for causing said feed rolls to rotate in unison.

11. In a wrapping machine, a rotatable carrier provided with pockets, levers pivoted to the said carrier and each provided with a portion forming a movable wall of said pockets, means acting on said levers to keep the pockets normally closed, means for imparting a step by step rotation to said carrier, and a cam for successively engaging said levers to open said pockets and means for intermittently actuating said cam to release said levers, whereby said pockets are closed.

12. In a wrapping machine, a rotatable carrier provided with pockets, levers pivoted to the said carrier and each provided with a portion forming a movable wall of said pockets, means for imparting a step by step rotation to said carrier, means acting on said levers for normally holding said movable walls in closed position, a cam engaging said levers for successively actuating the latter to open said pockets and means for intermittently actuating said cam to release said levers, whereby said pockets are closed.

13. In a wrapping machine, a rotatable carrier provided with pockets, levers pivoted to the said carrier and each provided with a portion forming a movable wall of said pockets, means for imparting a step by step rotation to said carrier, springs acting on said levers to hold said movable walls in closed position, a cam for rocking said levers to open said pockets, and means for periodically oscillating said cam to bring the latter into the path of movement of said levers.

14. In a wrapping machine, a rotatable carrier provided with pockets, levers pivoted to the said carrier and each provided with a portion forming a movable wall of said pockets, means for imparting a step by step rotation to said carrier, springs acting on said levers to hold said movable walls in closed position, a rock shaft, a cam loosely mounted thereon, and means operated by said rock shaft for moving said cam into the path of movement of said levers, whereby said side walls are opened.

15. In a wrapping machine, a rotatable carrier provided with pockets, levers pivoted to the said carrier and each provided with a portion forming a movable wall of said pockets, means for imparting a step by step rotation to said carrier, springs acting on said levers to hold said movable walls in closed position, a rock shaft, a cam loosely mounted on said rock shaft and provided with an extension, and means operated by said rock shaft for periodically engaging said extension to move said cam into the path of movement of said levers, whereby said movable walls are opened.

16. In a wrapping machine, a rotatable carrier provided with pockets, levers pivoted to the said carrier and each provided with a portion forming a movable wall of said pockets, means for imparting a step by step rotation to said carrier, springs acting on said levers to hold said movable walls in closed position, a rock shaft, a cam mounted on said rock shaft and provided with an extension, an oscillating member secured to and movable with said rock shaft, and means operated by said oscillating member for periodically engaging said extension to move said cam into the path of movement of said levers, whereby said movable walls are opened.

17. In a wrapping machine, a rotatable carrier provided with pockets, levers pivoted to the said carrier and each provided with a portion forming a movable wall of said pockets, means for imparting a step by step rotation to said carrier, springs acting on said levers to hold said movable walls in closed position, a rock shaft, a cam loosely mounted on said rock shaft, a toothed sector secured to said rock shaft, an oscillating arm actuated by said sector, and means operated by said arm for moving said cam into the path of movement of said levers, whereby said movable walls are opened.

18. In a wrapping machine, a rotatable carrier provided with pockets, levers pivoted to the said carrier and each provided with a portion forming a movable wall of said pockets, means for imparting a step by step rotation to said carrier, springs acting on said levers to hold said movable walls in closed position, a rock shaft, a cam loosely mounted on said rock shaft, said cam being provided with a projection, a toothed sector secured to said rock shaft, and an oscillating arm having teeth meshing with said sector, said arm being adapted to engage said projection to move the cam into the path of movement of said levers, whereby said movable walls are opened.

19. In a wrapping machine, a rotatable carrier provided with pockets, means for imparting a step by step movement thereto, means for supplying wrappers, a plunger for forcing the articles to be wrapped into said pockets, folding members supported independently of the carrier and between which the plunger forces the articles and wrappers to impart a preliminary fold to each wrapper, and means operable when the plunger is withdrawn for imparting a lateral movement to one of said folding members to impart an additional fold to each wrapper.

20. In a wrapping machine, a rotatable carrier, provided with pockets, means for imparting a step by step movement thereto, means for supplying wrappers, a plunger for forcing the articles to be wrapped into said pockets, folding members between which the plunger forces the articles and wrappers to impart a preliminary fold to each wrapper, one of said folding members being supported by a folder arm, and means operable when the plunger is withdrawn for periodically oscillating said folder arm to impart a second fold to the wrapper.

21. In a wrapping machine, a rotatable carrier, provided with pockets, means for imparting a step by step movement thereto, means for supplying wrappers, a plunger for forcing the articles to be wrapped into said pockets, folding members between which the plunger forces the articles and wrappers to impart a preliminary fold to each wrapper, a back folder arm carrying one of said folding members, a lever supporting said back folder arm, and means operable when the plunger is withdrawn for periodically oscillating said lever.

22. In a wrapping machine, a rotatable carrier provided with pockets, means for imparting a step by step movement thereto, means for supplying wrappers, a plunger for forcing the articles to be wrapped into said pockets, folding members between which the plunger forces the articles and wrappers to impart a preliminary fold to each wrapper, a back folder arm carrying one of said folding members, and means operable when the plunger is withdrawn for moving said back folder arm transversely.

23. In a wrapping machine, a rotatable carrier provided with pockets, means for imparting a step by step movement thereto, means for supplying wrappers, a plunger for forcing the articles to be wrapped into said pockets, folding members between which the plunger forces the articles and wrappers to impart a preliminary fold to each wrapper, a back folder arm carrying one of said folding members, means operable when the plunger is withdrawn for moving said back folder arm transversely of the path of movement of said plunger, and means for moving said back folder arm to clear the edge of the article to be wrapped as said article is moved by said carrier.

24. In a wrapping machine, a rotatable carrier provided with pockets, means for imparting a step by step movement thereto, means for supplying wrappers, a plunger for forcing the articles to be wrapped into said pockets, folding members between which said plunger forces the articles and wrappers to impart a preliminary fold to each wrapper, a back folder arm carrying one of said folder members, a lever supporting said back folder arm, means operable when the plunger is withdrawn, for periodically oscillating said lever, and means for moving said back folder arm to clear the edge of the article to be wrapped as said article is moved by said carrier.

25. In a wrapping machine, a rotatable carrier provided with pockets, a plunger for forcing the articles to be wrapped into said pockets, folding members between which the plunger forces the articles and wrappers to impart a preliminary fold to each wrapper, one of said folding members being movable and the other stationary, means operable when the plunger is withdrawn for moving the movable member transversely to impart a second fold to the wrapper, and means for imparting a step by step rotation to said carrier in a direction toward said stationary folding member.

26. In a wrapping machine, a rotatable carrier provided with pockets, a plunger for forcing the articles to be wrapped into said pockets, folding members between which the plunger forces the articles and wrappers to impart a preliminary fold to each wrapper, one of said folding members being movable and the other stationary, a lever supporting said movable folding member to impart a second fold to the wrapper, means operable when the plunger is withdrawn for periodically oscillating said lever, and means for imparting a step by step rotation to said carrier in a direction toward said stationary folding member.

27. In a wrapping machine, a rotatable carrier provided with pockets, levers pivoted to the said carrier and each carrying a portion forming a movable wall of said pockets, means for imparting a step by step rotation to said carrier, a plunger for placing the articles to be wrapped into said pockets, folding members coöperating with said plunger to impart a preliminary fold to each wrapper, one of said folding members being movable, means for periodically actuating said movable folder member, and means actuated by said movable folder member for successively rocking said levers.

28. In a wrapping machine, a rotatable carrier provided with pockets, levers pivoted to the said carrier and each carrying a portion forming a movable wall for said pockets, means for imparting a step by step rotation to said carrier, a plunger for placing the articles to be wrapped into said pockets, folding members coöperating with said plunger to impart a preliminary fold to each wrapper, one of said folding members being movable, means for periodically actuating said movable folder member, means acting on said levers for normally holding said movable walls in closed position, and means actuated by said movable folder member for successively operating said levers to open said pockets.

29. In a wrapping machine, a rotatable carrier provided with pockets, levers pivoted to the said carrier and each carrying a portion forming a movable wall for said pockets, means for imparting a step by step rotation to said carrier, a plunger for placing the articles to be wrapped into said pockets, folding members coöperating with said plunger to impart a preliminary fold to each wrapper, one of said folding members being movable, means for periodically actuating said movable folder member, springs acting on said levers to hold said movable walls in closed position, a cam for rocking said levers to open said pockets, and means actuated by said movable folding member to bring said cam into the path of movement of said levers.

30. In a wrapping machine, a rotatable carrier provided with pockets, levers pivoted to the said carrier and each carrying a portion forming a movable wall for said pockets, means for imparting a step by step rotation to said carrier, a plunger for placing the articles to be wrapped into said pockets, folding members coöperating with said plunger to impart a preliminary fold to each wrapper, one of said folding members being movable, means for periodically actuating said movable folder member, springs acting on said levers to hold said movable walls in closed position, a cam for rocking said levers to open said pockets, said cam being provided with an extension, and means actuated by said movable folding member for engaging said extension to bring the cam into the path of movement of said levers.

31. In a wrapping machine, a rotatable carrier provided with pockets, levers pivoted to the said carrier and each carrying a portion forming a movable wall for said pockets, means for imparting a step by step rotation to said carrier, a plunger for placing the articles to be wrapped into said pockets, folding members coöperating with said plunger to impart a preliminary fold to each wrapper, one of said folding members being movable, means for periodically actuating said movable folder member, springs acting on said levers to hold said movable walls in closed position, a cam for rocking said levers to open said pockets, an oscillating arm for moving said cam into the path of movement of the said levers, and means connected with said movable folder member for oscillating said arm.

32. In a wrapping machine, a rotatable carrier, a plunger for delivering the articles to be wrapped to said carrier, a feed belt located above the normal plane of said plunger, a pusher arranged to operate transversely of said belt to transfer the articles to be wrapped to said plunger, said pusher being provided with rack teeth, a rock shaft, a toothed sector secured to said rock shaft and meshing with said rack teeth, and means for actuating said plunger and said rock shaft in time with each other.

33. In a wrapping machine, a rotatable carrier, a plunger for delivering the articles to be wrapped to said carrier, a feed belt, a pusher for transferring said articles from said belt to said plunger, a rock shaft, means connected with said rock shaft for actuating said pusher, a tucker member coöperating with said carrier, and means operated by said rock shaft for actuating said tucker member.

34. In a wrapping machine, a rotatable carrier, a plunger for delivering the articles to be wrapped to said carrier, a feed belt, a reciprocating pusher for transferring said articles from said belt to said plunger, a rock shaft, means connected with said rock shaft for actuating said pusher, a reciprocating tucker member coöperating with said carrier, and means operated by said rock shaft for actuating said tucker member.

35. In a wrapping machine, a rotatable carrier, a plunger for delivering the articles to be wrapped to said carrier, a feed belt, a pusher for transferring said articles from said belt to said plunger, a rock shaft, means connected with said rock shaft for actuating said pusher, a rack bar, means connected with said rock shaft for reciprocating said rack bar, and a tucker member carried by said rack bar.

36. In a wrapping machine, a rotatable carrier, a plunger for delivering the articles to be wrapped to said carrier, a feed belt, a pusher for transferring said articles from said belt to said plunger, a rock shaft, a toothed sector secured thereto, a tucker member, means operated by said sector for actuating said tucker member, and means connected with said rock shaft for actuating said pusher.

37. In a wrapping machine, a rotatable carrier, a plunger for delivering the articles to be wrapped to said carrier, a feed belt, a pusher for transferring said articles from said belt to said plunger, a rock shaft, a toothed sector secured to said rock shaft, a tucker member, a second sector operated by the first sector to actuate said tucker member, and means operated by said rock shaft for actuating said pusher.

38. In a wrapping machine, a rotatable carrier, a plunger located below said carrier for successively presenting the articles to be wrapped to said carrier, means for successively placing the articles upon said plunger, means for operating said carrier step by step, a tucker member coöperating with said carrier, a rock shaft provided with means for operating said tucker and said article placing means, and means for periodically actuating said rock shaft.

39. In a wrapping machine, a rotatable carrier, a plunger located below said carrier for successively presenting the articles to be wrapped to said carrier, means for successively placing the articles upon said plunger, means for operating said carrier step by step, a reciprocable member provided with tuckers coöperating with said carrier, a rock shaft provided with means for operating said reciprocable member and said article placing means, and means for periodically reciprocating said rock shaft.

40. In a wrapping machine, a rotatable carrier, means for successively presenting the articles to be wrapped to said carrier, means for operating said carrier step by step, a rack member provided with tuckers coöperating with said carrier, an oscillating member provided with teeth meshing with the teeth of said rack member, a rock shaft, and means connected with said rock shaft for periodically actuating said oscillating member.

41. In a wrapping machine, a rotatable carrier, means for successively presenting the articles to be wrapped to said carrier, means for operating said carrier step by step, a rack member provided with tuckers coöperating with said carrier, an oscillating member formed of angularly disposed toothed sectors one of which meshes with the teeth of said rack member, a rock shaft, and a third sector secured to said rock shaft and meshing with the other sector of said oscillating member.

42. In a wrapping machine, a rotatable carrier, means for successively presenting the articles to be wrapped to said carrier, means for operating said carrier step by step, a rotatable tucker coöperating with said carrier, an immovable support therefor, and means for imparting a step by step rotation to said tucker.

43. In a wrapping machine, a rotatable carrier, means for successively presenting the articles to be wrapped to said carrier, means for operating said carrier step by step, a rotatable member provided with peripheral tucker fingers coöperating with said carrier and an immovable support for said rotatable member.

44. In a wrapping machine, a rotatable carrier, means for successively presenting the articles to be wrapped to said carrier, means for operating said carrier step by step, a rotatable member provided with peripheral tucker fingers coöperating with said carrier, an immovable support for said tucker member and means for rotating said member step by step.

45. In a wrapping machine, a rotatable carrier, means for actuating the same, means for presenting wrappers, means for folding the wrappers around the sides of the articles to be wrapped while supported by said carrier, reciprocable and rotary tuckers for folding the ends of the wrappers around said packages while the latter are supported by the carrier and a normally stationary support for said rotary tucker.

46. In a wrapping machine, a rotatable carrier, means for actuating the same, means for presenting wrappers, means for folding the wrappers around the sides of the articles to be wrapped while supported by said carrier, reciprocable and rotary tuckers for folding the ends of the wrappers around said packages while the latter are supported by the carrier, and a normally stationary support for said rotary tucker, and means for delivering the wrapped package from said carrier.

In testimony whereof I have signed my name to this specification in the presence of two subscribing witnesses.

THEODORE G. McGIRR.

Witnesses:
CHARLES P. RUSSELL,
C. B. BRANDS.

Correction in Letters Patent No. 1,091,684.

It is hereby certified that the assignee in Letters Patent No. 1,091,684, granted March 31, 1914, upon the application of Theodore G. McGirr, of Springfield, Massachusetts, for an improvement in "Machines for Wrapping Yeast-Cakes and Similar Articles," was erroneously described and specified as "Usonia Machine Company," whereas said corporation should have been described and specified as *Usona Machine Company*, as shown by the records of assignments in this office; and that the said Letters Patent should be read with this correction therein that the same may conform to the record of the case in the Patent Office.

Signed and sealed this 21st day of April, A. D., 1914.

[SEAL.]

J. T. NEWTON,
*Acting Commissioner of Patents.*